United States Patent
Lawrence et al.

(10) Patent No.: US 12,460,120 B1
(45) Date of Patent: Nov. 4, 2025

(54) METHODS FOR CURING LOST CIRCULATION IN SUBTERRANEAN FORMATIONS

(71) Applicant: SAUDI ARABIAN OIL COMPANY, Dhahran (SA)

(72) Inventors: Don Lawrence, Houston, TX (US); Ahmed Al-Dughaither, Dhahran (SA); Abdullah Abahussain, Dhahran (SA); Abdulaziz Bahamdan, Dhahran (SA); Aljazi Al-Ajmi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/782,635

(22) Filed: Jul. 24, 2024

(51) Int. Cl.
| | |
|---|---|
| *C09K 8/487* | (2006.01) |
| *C04B 22/12* | (2006.01) |
| *C04B 28/26* | (2006.01) |
| *E21B 33/138* | (2006.01) |
| *C04B 103/20* | (2006.01) |
| *C04B 103/50* | (2006.01) |

(52) U.S. Cl.
CPC ............ *C09K 8/487* (2013.01); *C04B 22/124* (2013.01); *C04B 28/26* (2013.01); *E21B 33/138* (2013.01); *C04B 2103/20* (2013.01); *C04B 2103/50* (2013.01)

(58) Field of Classification Search
None
See application file for complete search history.

(56) References Cited

U.S. PATENT DOCUMENTS

| | | |
|---|---|---|
| 10,329,473 B2 | 6/2019 | Reddy |
| 2019/0106952 A1* | 4/2019 | Shine, Jr. ............. E21B 21/003 |

FOREIGN PATENT DOCUMENTS

| | | | | |
|---|---|---|---|---|
| WO | WO 2025034820 | * | 2/2025 | ........... E21B 33/138 |

OTHER PUBLICATIONS

Canson, B. E. "Lost Circulation Treatments for Naturally Fractured, Vugular, or Cavernous Formations." Paper presented at the SPE/IADC Drilling Conference, New Orleans, Louisiana, Mar. 1985.

Olsen, Maximillian, et al., "Innovative and Established LCM Cementing Solutions Combined to Create Novel LCM Cementing Fluid Train." Paper presented at the SPE Norway One Day Seminar, Bergen, Norway, May 2019.

Hasan, Hawraz, et al., "Apply Cost Effective Multiple Cementing Technologies to Sidetrack in Air Drilling Environment in Chiya Khere Field." Paper presented at the International Petroleum Technology Conference, Bangkok, Thailand, Mar. 2023.

Mahapatra, Shrikant K., et al. "New Technique to Cure Losses in UeR Formation in South Oman Field—A Case Study." Paper presented at the Abu Dhabi International Petroleum Exhibition and Conference, Abu Dhabi, UAE, Nov. 2008.

Fidan, E., Babadagli, et al. "Use of Cement as Lost-Circulation Material: Best Practices." Paper presented at the Canadian International Petroleum Conference, Calgary, Alberta, Jun. 2004.

Oil Serv; Cement Program, Aug. 14, 2022.

* cited by examiner

*Primary Examiner* — Anuradha Ahuja
(74) *Attorney, Agent, or Firm* — Vorys, Sater, Seymour and Pease, LLP

(57) ABSTRACT

Methods comprise introducing a first fluid pill and a second fluid pill into a subterranean formation containing at least one lost circulation zone via a wellbore; allowing the first fluid pill to interact with the second fluid pill to form a solid within the at least one lost circulation zone; introducing a first cement into the subterranean formation; allowing at least a portion of the first cement to solidify within the at least one lost circulation zone; consecutively reintroducing the first fluid pill and the second fluid pill into the subterranean formation; introducing a plurality of cements having progressively higher thixotropies; and allowing the plurality of cements to solidify within the at least one lost circulation zone.

13 Claims, No Drawings

METHODS FOR CURING LOST CIRCULATION IN SUBTERRANEAN FORMATIONS

FIELD OF THE DISCLOSURE

The present disclosure relates generally to lost circulation in subterranean formations and, more particularly, to curing lost circulation in subterranean formations.

BACKGROUND OF THE DISCLOSURE

Lost circulation is a significant challenge encountered in the drilling of subterranean formations, referring to the unintended flow of drilling fluids into the formation, rather than returning to the surface. This phenomenon can lead to a range of operational difficulties, including increased drilling costs, non-productive time, and potential well control issues. Lost circulation typically occurs when the drilling fluid encounters a formation with high permeability or natural fractures, which allows the fluid to escape into the formation. The severity of lost circulation can vary from minor seepage to complete loss of circulation, where the entire volume of drilling fluid is lost into the formation. Addressing lost circulation is critical to maintaining wellbore stability, preventing formation damage, and ensuring the safety and efficiency of drilling operations.

To mitigate lost circulation, various materials known as lost circulation materials (LCMs) are employed. LCMs are designed to seal the permeable zones or fractures in the formation, thereby preventing the loss of drilling fluids. These materials can be broadly categorized into three types: particulate, fibrous, and chemical. Particulate LCMs include materials such as ground marble, calcium carbonate, and nut shells, which work by physically plugging the pores or fractures in the formation. Fibrous LCMs, such as cellulose fibers, cottonseed hulls, and mineral fibers, create a mat-like structure that bridges and seals the formation openings. Chemical LCMs are reactive materials that form a seal through chemical reactions, with examples including cross-linked polymers and cement slurries.

One of the established methods for addressing severe lost circulation is the balanced plug method. This technique involves placing a plug of cement or other sealing material into the wellbore at the point of fluid loss. The balanced plug method is designed to create a pressure-balanced condition, where the hydrostatic pressure of the drilling fluid is equalized with the formation pressure. This balance helps to prevent further fluid loss and stabilizes the wellbore.

However, the balanced plug method has several limitations. The success of this method depends heavily on accurate placement and proper formulation of the sealing material. Misplacement of the plug can result in ineffective sealing, leading to continued fluid loss and potential well control issues. Additionally, the process of setting a balanced plug can be time-consuming and requires precise calculations to ensure the correct volume and placement of the sealing material. In formations with highly variable permeability or complex fracture networks, achieving a perfect balance can be particularly challenging. Furthermore, the materials used in balanced plugs may not always provide a long-term solution, as they can degrade over time or fail to fully seal the lost circulation zone. Given these limitations, there is a need for improved methods and materials for lost circulation control.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, methods may include introducing a first fluid pill comprising a calcium salt into a subterranean formation containing at least one lost circulation zone via a wellbore; introducing a second fluid pill comprising a silicate into the subterranean formation via the wellbore; allowing the first fluid pill to interact with the second fluid pill to form a solid within the at least one lost circulation zone; introducing a first cement into the subterranean formation after introducing the first fluid pill and the second fluid pill into the subterranean formation via the wellbore; allowing at least a portion of the first cement to solidify within the at least one lost circulation zone; consecutively reintroducing the first fluid pill and the second fluid pill into the subterranean formation via the wellbore after allowing at least a portion of the first cement to solidify within the at least one lost circulation zone; introducing a second cement having a higher thixotropy than the first cement into the subterranean formation via the wellbore after reintroducing the first fluid pill and the second fluid pill into the subterranean formation; allowing at least a portion of the second cement to solidify within the at least one lost circulation zone; consecutively reintroducing the first fluid pill and the second fluid pill into the subterranean formation via the wellbore after allowing at least the portion of the second cement to solidify within the at least one lost circulation zone; introducing a third cement having a higher thixotropy than the second cement into the subterranean formation via the wellbore; and allowing at least a portion of the third cement to solidify within the at least one lost circulation zone; wherein a flow of fluids from the wellbore into the subterranean formation is mitigated due to the placement of the first cement, the second cement, and the third cement in the at least one lost circulation zone.

In another embodiment, methods may include introducing a first fluid pill comprising calcium chloride into a subterranean formation containing at least one lost circulation zone via a wellbore; introducing a second fluid pill comprising a sodium silicate into the subterranean formation via the wellbore; allowing the first fluid pill to interact with the second fluid pill to form a solid within the at last one lost circulation zone; introducing a first cement comprising an extender, a retarder, a defoamer, or any combination thereof into the subterranean formation after introducing the first fluid pill and the second fluid pill into the subterranean formation via the wellbore; allowing at least a portion of the first cement to solidify within the at least one lost circulation zone; consecutively reintroducing the first fluid pill and the second fluid pill into the subterranean formation via the wellbore after allowing at least the portion of the first cement to solidify within the at least one lost circulation zone; introducing a second cement having a higher thixotropy than the first cement into the subterranean formation via the wellbore after reintroducing the first fluid pill and the second fluid pill into the subterranean formation; wherein the second cement lacks an extender or a retarder; allowing at least a portion of the second cement to solidify within the at least one lost circulation zone; consecutively reintroducing the first fluid pill and the second fluid pill into the subterranean formation via the wellbore after allowing at least the portion of the second cement to solidify within the at least one lost circulation zone; introducing a third cement having a higher thixotropy than the second cement into the subterranean formation via the wellbore; wherein the third cement lacks an extender or a retarder; and allowing at least a portion of the third cement to solidify within the at least one lost circulation zone; wherein a flow of fluids from the wellbore into the subterranean formation is mitigated due to the placement of the first cement, the second cement, and the third cement in the at least one lost circulation zone.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Not applicable.

DETAILED DESCRIPTION

Embodiments in accordance with the present disclosure generally relate to lost circulation in subterranean formations and, more particularly, to curing lost circulation in subterranean formations. As mentioned previously, the balanced plug method for addressing lost circulation in subterranean formations is subject to many limitations. The present disclosure addresses the challenge of lost circulation during well construction by utilizing an engineered train of cementing fluids tailored for remedial purposes. It may include pumping a series of viscous, reactive pills comprising $CaCl_2$) and sodium silicate solutions ahead of and between progressively thixotropic and aggressive cementing fluids. The process may begin with a low-density thixotropic cement that reduces hydrostatic pressure and gels quickly upon contact with the reactive pills, followed by a nominal density thixotropic cement, and concluding with a normal cement slurry with minimal thickening time. Unlike the traditional balanced plug method, which uses small volumes of cement and often requires multiple attempts, the methods of the present disclosure may treat the lost circulation zone as a squeeze job, forcing large volumes of cement with reactive fluids into the lost circulation zone. This method may potentially improve the effectiveness of sealing the lost circulation zone by using multiple cement slurries with increasingly aggressive setting properties.

As used herein, the term "thixotropy" and grammatical variants thereof refer to a fluid that exhibits a shear thinning property under shear stress (e.g., pumping and/or agitation) but develops a gel structure and becomes self-supporting when the source of shear stress ceases.

For example, thixotropic cement slurries may be thin and fluid during mixing and displacement, but may rapidly form a rigid, self-supporting gel structure when pumping ceases. Furthermore, a degree of thixotropy may be estimated in a lab setting from 10-second, 10-minute, or 30-minute gel strengths taken after measuring the rheology of a fluid on a rotational viscometer.

As used herein, the term "lost circulation zone," also termed "loss circulation zone" or "thief zone," refer to an area in a subterranean formation in which there may be uncontrolled flow of whole mud or circulating fluids into the formation.

As used herein, the term "pill" and grammatical variants thereof refer to a small volume of drilling fluid placed or circulated in the wellbore of a subterranean formation.

Therefore, methods for curing lost circulation in subterranean formations may comprise introducing a first fluid pill comprising a calcium salt into a subterranean formation containing at least one lost circulation zone via a wellbore; introducing a second fluid pill comprising a silicate into the subterranean formation via the wellbore; allowing the first fluid pill to interact with the second fluid pill to form a solid within the at least one lost circulation zone; introducing a first cement into the subterranean formation after introducing the first fluid pill and the second fluid pill into the subterranean formation via the wellbore; allowing at least a portion of the first cement to solidify within the at least one lost circulation zone; consecutively reintroducing the first fluid pill and the second fluid pill into the subterranean formation via the wellbore after allowing at least the portion of the first cement to solidify within the at least one lost circulation zone; introducing a second cement having a higher thixotropy than the first cement into the subterranean formation via the wellbore after reintroducing the first fluid pill and the second fluid pill in to the subterranean formation; allowing at least a portion of the second cement to solidify within the at least one lost circulation zone; consecutively reintroducing the first fluid pill and the second fluid pill into the subterranean formation via the wellbore after allowing at least the portion of the second cement to solidify within the at least one lost circulation zone; introducing a third cement having a higher thixotropy than the second cement into the subterranean formation via the wellbore; and allowing at least a portion of the third cement to solidify within the at least one lost circulation zone; wherein a flow of fluids from the wellbore into the subterranean formation is mitigated due to the placement of the first cement, the second cement, and the third cement in the at least one lost circulation zone.

In another embodiment, methods for curing lost circulation in subterranean formations may comprise introducing a first fluid pill comprising calcium chloride into a subterranean formation containing at least one lost circulation zone via a wellbore; introducing a second fluid pill comprising a sodium silicate into the subterranean formation via the wellbore; allowing the first fluid pill to interact with the second fluid pill to form a solid within the at least one lost circulation zone; introducing a first cement comprising an extender, a retarder, a defoamer, or any combination thereof into the subterranean formation after introducing the first fluid pill and the second fluid pill into the subterranean formation via the wellbore; allowing at least a portion of the first cement to solidify within the at least one lost circulation zone; consecutively reintroducing the first fluid pill and the second fluid pill into the subterranean formation via the wellbore after allowing at least the portion of the first cement to solidify within the at least one lost circulation zone; introducing a second cement having a higher thixotropy than the first cement into the subterranean formation via the wellbore after reintroducing the first fluid pill and the second fluid pill into the subterranean formation; wherein the second cement lacks an extender or a retarder; allowing at least a portion of the second cement to solidify within the at least one lost circulation zone; consecutively reintroducing the first fluid pill and the second fluid pill into the subterranean formation via the wellbore after allowing at least the portion of the second cement to solidify within the at least one lost circulation zone; introducing a third cement having a higher thixotropy than the second cement into the subterranean formation via the wellbore; wherein the third cement lacks an extender or a retarder; and allowing at least a portion of the third cement to solidify within the at least one lost circulation zone; wherein a flow of fluids from the wellbore into the subterranean formation is mitigated due to the placement of the first cement, the second cement, and the third cement in the at least one lost circulation zone.

The introduction of the first fluid pill comprising a calcium salt and the second fluid pill comprising a silicate into the subterranean formation may result in the first fluid pill and the second fluid pill entering one or more lost circulation zones. Upon the interaction of the first and second fluid pills, a reaction may occur to produce a solid within the lost circulation zone. For example, the calcium salt may comprise a calcium chloride and the silicate may comprise a sodium silicate, such as a sodium metasilicate, sodium orthosilicate, sodium pyrosilicate, the like, and any combination thereof. In the instance that the first fluid pill and the second fluid pill comprise calcium chloride and sodium silicate, respectively, the first fluid pill and the second fluid pill may interact to form a solid precipitate, calcium silicate, within the lost circulation zone.

The first fluid pill may, for example, have a concentration of the calcium salt of about 10 wt % to about 50 wt %, or about 10 wt % to about 40 wt %, or about 10 wt % to about 30 wt %, or about 10 wt % to about 20 wt %, or about 20 wt % to about 50 wt %, or about 20 wt % to about 40 wt %, or about 20 wt % to about 30 wt %, or about 30 wt % to about 50 wt %, or about 30 wt % to about 40 wt %, or about 40 wt % to about 50 wt %. Furthermore, the second fluid pill may, for example, have a silicate concentration of about 25 vol % to about 75 vol %, or about 25 vol % to about 60 vol %, or about 25 vol % to about 50 vol %, or about 25 vol % to about 40 vol %, or about 40 vol % to about 75 vol %, or about 40 vol % to about 60 vol %, or about 40 vol % to about 50 vol %, or about 50 vol % to about 75 vol %, or about 50 vol % to about 60 vol %, or about 60 vol % to about 75 vol %.

The first fluid pill may, for example, have a density of about 60 lb/ft$^3$ to about 90 lb/ft$^3$, or about 60 lb/ft$^3$ to about 80 lb/ft$^3$, or about 50 lb/ft$^3$ to about 70 lb/ft$^3$, or about 70 lb/ft$^3$ to about 90 lb/ft$^3$, or about 70 lb/ft$^3$ to about 80 lb/ft$^3$, or about 80 lb/ft$^3$ to about 90 lb/ft$^3$. The second fluid pill may similarly, for example, have a density of about 60 lb/ft$^3$ to about 90 lb/ft$^3$, or about 60 lb/ft$^3$ to about 80 lb/ft$^3$, or about 50 lb/ft$^3$ to about 70 lb/ft$^3$, or about 70 lb/ft$^3$ to about 90 lb/ft$^3$, or about 70 lb/ft$^3$ to about 80 lb/ft$^3$, or about 80 lb/ft$^3$ to about 90 lb/ft$^3$.

Each first fluid pill may, for example, have a volume of about 80 bbl to about 120 bbl, or about 80 bbl to about 110 bbl, or about 80 bbl to about 100 bbl, or about 80 bbl to about 90 bbl, or about 90 bbl to about 120 bbl, or about 90 bbl to about 110 bbl, or about 90 bbl to about 100 bbl, or about 100 bbl to about 120 bbl, or about 100 bbl to about 110 bbl, or about 110 bbl to about 120 bbl. Each second fluid pill may, for example, also have a volume of about 80 bbl to about 120 bbl, or about 80 bbl to about 110 bbl, or about 80 bbl to about 100 bbl, or about 80 bbl to about 90 bbl, or about 90 bbl to about 120 bbl, or about 90 bbl to about 110 bbl, or about 90 bbl to about 100 bbl, or about 100 bbl to about 120 bbl, or about 100 bbl to about 110 bbl, or about 110 bbl to about 120 bbl.

After the introduction of the first and second fluid pills and allowing the fluid pills to interact to form a solid within the lost circulation zone, a first cement may be introduced via the wellbore into the subterranean formation and, subsequently, into the lost circulation zone. The cement, for example, may comprise an extender, a retarder, a defoamer, or any combination thereof. Extenders suitable for the methods of the present disclosure include, but are not limited to, physical extenders (e.g., bentonite, attapulgite, expanded perlite, gilsonite, crushed coal, ground rubber), pozzolanic extenders (e.g., fly ash, microspheres, microsilica, diatomaceous earth), chemical extenders (e.g., sodium silicate, gypsum), the like, and any combination thereof. Suitable retarders for the methods of the present disclosure include, but are not limited to, lignosulphonates, cellulose derivatives, hydroxycarboxylic acids (e.g., citric acid, tartaric acid, gluconic acid, glucoheptonate, glucono-delta-lactone), organophosphates, synthetic retarders (e.g., maleic anhydride, 2-acrylamido-2-methylpropanesulfoniac acid copolymers), inorganic compounds (e.g., borax, boric acid, zinc oxide), the like, and any combination thereof. Other suitable cement components for the methods of the present disclosure include, but are not limited to, defoamers (e.g., ethylene glycol, silicones), dispersants (e.g., polyunsulfonated naphthalene, hydroxycarboxylic acids), friction reducers, expanders, accelerators, spacers, flushing agents, suspending agents, weighting agents (e.g., hematite, ilmenite, hausmannite, barite), the like, and any combination thereof.

The first cement may, for example, have a density of about 80 lb/ft$^3$ to about 120 lb/ft$^3$, or about 80 lb/ft$^3$ to about 110 lb/ft$^3$, or about 80 lb/ft$^3$ to about 100 lb/ft$^3$, or about 80 lb/ft$^3$ to about 90 lb/ft$^3$, or about 90 lb/ft$^3$ to about 120 lb/ft$^3$, or about 90 lb/ft$^3$ to about 110 lb/ft$^3$, or about 90 lb/ft$^3$ to about 100 lb/ft$^3$, or about 100 lb/ft$^3$ to about 120 lb/ft$^3$, or about 100 lb/ft$^3$ to about 110 lb/ft$^3$, or about 110 lb/ft$^3$ to about 120 lb/ft$^3$. The cement may combine with the solid, and at least a portion of the cement may solidify within the lost circulation zone.

Following the solidification of at least a portion of the first cement within the lost circulation zone, the first and second fluid pills may be consecutively reintroduced into the subterranean formation. Similarly, the first and second fluid pills may again enter the lost circulation zone and interact to form a solid. A second application of cement may be introduced into the subterranean formation. This second cement may have a higher thixotropy than the first cement and may lack certain components, such as an extender or retarder. Without being bound by any theory, the second cement may not require an extender or retarder due to the solid product formed by the reaction of the components of the first and second fluid pills.

The second cement may, for example, have a density of about 100 lb/ft$^3$ to about 140 lb/ft$^3$, or about 100 lb/ft$^3$ to about 130 lb/ft$^3$, or about 100 lb/ft$^3$ to about 120 lb/ft$^3$, or about 100 lb/ft$^3$ to about 110 lb/ft$^3$, or about 110 lb/ft$^3$ to about 140 lb/ft$^3$, or about 110 lb/ft$^3$ to about 130 lb/ft$^3$, or about 110 lb/ft$^3$ to about 120 lb/ft$^3$, or about 120 lb/ft$^3$ to about 140 lb/ft$^3$, or about 120 lb/ft$^3$ to about 130 lb/ft$^3$, or about 130 lb/ft$^3$ to about 140 lb/ft$^3$.

This process may be repeated a third time. For example, after at least a portion of the third cement solidifies within the lost circulation zone, the first and second fluid pills may again be consecutively reintroduced into the subterranean formation and enter the lost circulation zone, thus interacting to again form a solid. A third application of cement may be introduced into the subterranean formation, wherein the third cement may have a higher thixotropy than the second cement and again lack an extender or retarder.

The third cement may, for example, have a density of about 100 lb/ft$^3$ to about 140 lb/ft$^3$, or about 100 lb/ft$^3$ to about 130 lb/ft$^3$, or about 100 lb/ft$^3$ to about 120 lb/ft$^3$, or about 100 lb/ft$^3$ to about 110 lb/ft$^3$, or about 110 lb/ft$^3$ to about 140 lb/ft$^3$, or about 110 lb/ft$^3$ to about 130 lb/ft$^3$, or about 110 lb/ft$^3$ to about 120 lb/ft$^3$, or about 120 lb/ft$^3$ to about 140 lb/ft$^3$, or about 120 lb/ft$^3$ to about 130 lb/ft$^3$, or about 130 lb/ft$^3$ to about 140 lb/ft$^3$.

The introductions of the first fluid pill and the second fluid pill followed by a cement may be repeated as many times as necessary to at least partially mitigate a flow of fluids between the subterranean formation and the wellbore via the lost circulation zone. Mitigation of the flow of fluids may be referred to herein as a "fluidic seal," in which a barrier is formed to the flow of fluids (e.g., drilling fluids or other fluid types). A fluidic seal may form a barrier having a permeability of less than about 0.1 darcies, including complete sealing such that no fluid passes through the fluidic seal.

In any embodiment, a spacer comprising an aqueous fluid may by introduced into the subterranean formation between and/or before each step of introducing the first fluid pill, the second fluid pill, or cement. An aqueous fluid may be any suitable fluid, such as water or a solution containing both water and one or more organic or inorganic compounds dissolved in the water or otherwise completely miscible with the water. Examples of water sources may include, but are not limited to, freshwater, well water, filtered water, distilled water, seawater, salt water, produced water, formation brine, the like, and any combination thereof. For example, the aqueous fluid may include brine, including natural and synthetic brine. The aqueous fluid may include water containing water-soluble organic compounds, such as alcohols, organic acids, amines, aldehydes, ketones, esters, or other polar organic compounds, or salts dissolved in the water. In some embodiments, the aqueous fluid may include salts, water-soluble organic compounds, or both, as impurities dissolved in the water. Further, the aqueous fluid may include salts, water-soluble organic compounds, or both, to modify at least one property of the aqueous fluid, such as density or ionic concentration.

Each spacer may, for example, have a volume of about 1 bbl to about 100 bbl, or about 1 bbl to about 75 bbl, or about 1 bbl to about 50 bbl, or about 1 bbl to about 25 bbl, or about 25 bbl to about 100 bbl, or about 25 bbl to about 75 bbl, or about 25 bbl to about 50 bbl, or about 50 bbl to about 100 bbl, or about 50 bbl to about 75 bbl, or about 75 bbl to about 100 bbl.

The present disclosure is further directed to the following non-limiting clauses:

Clause 1. A method comprising:
introducing a first fluid pill comprising a calcium salt into a subterranean formation containing at least one lost circulation zone via a wellbore;
introducing a second fluid pill comprising a silicate into the subterranean formation via the wellbore;
allowing the first fluid pill to interact with the second fluid pill to form a solid within the at least one lost circulation zone;
introducing a first cement into the subterranean formation after introducing the first fluid pill and the second fluid pill into the subterranean formation via the wellbore;
allowing at least a portion of the first cement to solidify within the at least one lost circulation zone;
consecutively reintroducing the first fluid pill and the second fluid pill into the subterranean formation via the wellbore after allowing at least the portion of the first cement to solidify within the at least one lost circulation zone;
introducing a second cement having a higher thixotropy than the first cement into the subterranean formation via the wellbore after reintroducing the first fluid pill and the second fluid pill into the subterranean formation;
allowing at least a portion of the second cement to solidify within the at least one lost circulation zone;
consecutively reintroducing the first fluid pill and the second fluid pill into the subterranean formation via the wellbore after allowing at least the portion of the second cement to solidify within the at least one lost circulation zone;
introducing a third cement having a higher thixotropy than the second cement into the subterranean formation via the wellbore; and
allowing at least a portion of the third cement to solidify within the at least one lost circulation zone;
wherein a flow of fluids from the wellbore into the subterranean formation is mitigated due to the placement of the first cement, the second cement, and the third cement in the at least one lost circulation zone.

Clause 2. The method of clause 1, wherein the calcium salt comprises calcium chloride.

Clause 3. The method of clause 1 or clause 2, wherein the silicate comprises a sodium silicate.

Clause 4. The method of clause 3, wherein the sodium silicate comprises sodium metasilicate.

Clause 5. The method of any one of clauses 1-4, further comprising introducing a water spacer into the subterranean formation via the wellbore between the introductions of the first fluid pills and the second fluid pills.

Clause 6. The method of any one of clauses 1-5, wherein the first cement comprises an extender, a retarder, a defoamer, or any combination thereof.

Clause 7. The method of any one of clauses 1-6, wherein the second cement comprises a defoamer.

Clause 8. The method of clause 7, wherein the second cement lacks an extender or a retarder.

Clause 9. The method of any one of clauses 1-8, wherein the third cement comprises a defoamer.

Clause 10. The method of clause 9, wherein the third cement lacks an extender or a retarder.

Clause 11. The method of any one of clauses 1-10, further comprising repeating any of the steps at least once.

Clause 12. A method comprising:
introducing a first fluid pill comprising calcium chloride into a subterranean formation containing at least one lost circulation zone via a wellbore;
introducing a second fluid pill comprising a sodium silicate into the subterranean formation via the wellbore;
allowing the first fluid pill to interact with the second fluid pill to form a solid within the at least one lost circulation zone;
introducing a first cement comprising an extender, a retarder, a defoamer, or any combination thereof into the subterranean formation after introducing the first fluid pill and the second fluid pill into the subterranean formation via the wellbore;
allowing at least a portion of the first cement to solidify within the at least one lost circulation zone;
consecutively reintroducing the first fluid pill and the second fluid pill into the subterranean formation via the wellbore after allowing at least the portion of the first cement to solidify within the at least one lost circulation zone;
introducing a second cement having a higher thixotropy than the first cement into the subterranean formation via the wellbore after reintroducing the first fluid pill and the second fluid pill into the subterranean formation;

wherein the second cement lacks an extender or a retarder;

allowing at least a portion of the second cement to solidify within the at least one lost circulation zone;

consecutively reintroducing the first fluid pill and the second fluid pill into the subterranean formation via the wellbore after allowing at least the portion of the second cement to solidify within the at least one lost circulation zone;

introducing a third cement having a higher thixotropy than the second cement into the subterranean formation via the wellbore;

wherein the third cement lacks an extender or a retarder; and allowing at least a portion of the third cement to solidify within the at least one lost circulation zone;

wherein a flow of fluids from the wellbore into the subterranean formation is mitigated due to the placement of the first cement, the second cement, and the third cement in the at least one lost circulation zone.

Clause 13. The method of clause 12, wherein the sodium silicate comprises sodium metasilicate.

Clause 14. The method of clause 12 or clause 13, further comprising introducing a water spacer into the subterranean formation via the wellbore between the introductions of the first fluid pills and the second fluid pills.

Clause 15. The method of any one of clauses 1-14, further comprising repeating any of the steps at least once.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and are not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component or composition not expressly recited or disclosed herein. Any method may lack any step not recited or disclosed herein. Likewise, the term "comprising" is considered synonymous with the term "including." Whenever a method, composition, element, or group of elements is preceded with the transitional phrase "comprising," it is understood that we also contemplate the same composition or group of elements with the transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
   (a) introducing a first portion of a first fluid pill comprising a calcium salt into a subterranean formation containing a first lost circulation zone via a wellbore, wherein the first lost circulation zone comprises one or more lost circulation zones;
   (b) introducing a first portion of a second fluid pill comprising a silicate into the subterranean formation via the wellbore;
   (c) allowing the first portion of the first fluid pill to interact with the first portion of the second fluid pill to form a solid within the first lost circulation zone;

(d) introducing a first cement into the subterranean formation after introducing the first portions of the first fluid pill and the second fluid pill into the subterranean formation via the wellbore;

(e) allowing at least a portion of the first cement to solidify within the first lost circulation zone;

(f) consecutively introducing a second portion of the first fluid pill and a second portion of the second fluid pill into the subterranean formation via the wellbore after allowing at least the portion of the first cement to solidify within the first lost circulation zone;

(g) introducing a second cement having a higher thixotropy than the first cement into the subterranean formation via the wellbore after introducing the second portions of the first fluid pill and the second fluid pill into the subterranean formation;

(h) allowing at least a portion of the second cement to solidify within the first lost circulation zone;

(i) consecutively introducing a third portion of the first fluid pill and a third portion of the second fluid pill into the subterranean formation via the wellbore after allowing at least the portion of the second cement to solidify within the first lost circulation zone;

(j) introducing a third cement having a higher thixotropy than the second cement into the subterranean formation via the wellbore; and (k) allowing at least a portion of the third cement to solidify within the first lost circulation zone;

wherein a flow of fluids from the wellbore into the subterranean formation is mitigated due to the solidification of at least the portions, respectively, of the first cement, the second cement, and the third cement in the first lost circulation zone.

2. The method of claim 1, wherein the calcium salt comprises calcium chloride.

3. The method of claim 1, wherein the silicate comprises a sodium silicate.

4. The method of claim 3, wherein the sodium silicate comprises sodium metasilicate.

5. The method of claim 1, further comprising introducing a water spacer into the subterranean formation via the wellbore between the introductions of the first portion of the first fluid pill and the first portion of the second fluid pill.

6. The method of claim 1, wherein the first cement comprises an extender, a retarder, a defoamer, or any combination thereof.

7. The method of claim 1, wherein the second cement comprises a defoamer.

8. The method of claim 7, wherein the second cement lacks does not comprise an extender and a retarder.

9. The method of claim 1, wherein the third cement comprises a defoamer.

10. The method of claim 9, wherein the third cement lacks does not comprise an extender of and a retarder.

11. A method comprising:

(a) introducing a first portion of a first fluid pill comprising calcium chloride into a subterranean formation containing a first lost circulation zone via a wellbore, wherein the first lost circulation zone comprises one or more lost circulation zones;

(b) introducing a first portion of a second fluid pill comprising a sodium silicate into the subterranean formation via the wellbore;

(c) allowing the first portion of the first fluid pill to interact with the first portion of the second fluid pill to form a solid within the first lost circulation zone;

(d) introducing a first cement comprising an extender, a retarder, a defoamer, or any combination thereof into the subterranean formation after introducing the first portions of the first fluid pill and the second fluid pill into the subterranean formation via the wellbore;

(e) allowing at least a portion of the first cement to solidify within the at least first lost circulation zone;

(f) consecutively introducing a second portion of the first fluid pill and a second portion of the second fluid pill into the subterranean formation via the wellbore after allowing at least the portion of the first cement to solidify within the first lost circulation zone;

(g) introducing a second cement having a higher thixotropy than the first cement into the subterranean formation via the wellbore after introducing the second portions of the first fluid pill and the second fluid pill into the subterranean formation;

wherein the second cement does not comprise an extender and a retarder;

(h) allowing at least a portion of the second cement to solidify within the first lost circulation zone;

(i) consecutively introducing a third portion the first fluid pill and a third portion of the second fluid pill into the subterranean formation via the wellbore after allowing at least the portion of the second cement to solidify within the first lost circulation zone;

(j) introducing a third cement having a higher thixotropy than the second cement into the subterranean formation via the wellbore;

wherein the third cement does not comprise an extender and a retarder; and (k) allowing at least a portion of the third cement to solidify within the first lost circulation zone;

wherein a flow of fluids from the wellbore into the subterranean formation is mitigated due to the solidification of at least the portions, respectively, of the first cement, the second cement, and the third cement in the first lost circulation zone.

12. The method of claim 11, wherein the sodium silicate comprises sodium metasilicate.

13. The method of claim 11, further comprising introducing a water spacer into the subterranean formation via the wellbore between the introductions of the first portion of the first fluid pill and the first portion of the second fluid pill.

\* \* \* \* \*